(12) United States Patent
Cho et al.

(10) Patent No.: US 9,569,087 B2
(45) Date of Patent: Feb. 14, 2017

(54) FINGERPRINT IDENTIFYING METHOD AND ELECTRONIC DEVICE THEREOF

(71) Applicant: Samsung Electronics Co., Ltd., Gyeonggi-do (KR)

(72) Inventors: Jeong-Ho Cho, Gyeonggi-do (KR); Jeong-Min Park, Gyeonggi-do (KR); Do-Hyoung Chung, Seoul (KR); Ki-Hong Min, Seoul (KR); Dong-Han Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/669,694

(22) Filed: Mar. 26, 2015

(65) Prior Publication Data
US 2015/0278577 A1 Oct. 1, 2015

(30) Foreign Application Priority Data

Mar. 26, 2014 (KR) .......................... 10-2014-0035205

(51) Int. Cl.
| | |
|---|---|
| *G06K 9/62* | (2006.01) |
| *G06F 3/0486* | (2013.01) |
| *G06F 3/041* | (2006.01) |
| *G06F 3/0484* | (2013.01) |
| *G06K 9/00* | (2006.01) |

(52) U.S. Cl.
CPC ............. *G06F 3/0486* (2013.01); *G06F 3/041* (2013.01); *G06F 3/04842* (2013.01); *G06K 9/00026* (2013.01); *G06K 9/00892* (2013.01)

(58) Field of Classification Search
CPC .......................... G06K 9/00006; G06K 9/0012
See application file for complete search history.

(56) References Cited

U.S. PATENT DOCUMENTS

| | | | | | |
|---|---|---|---|---|---|
| 7,277,562 | B2 * | 10/2007 | Zyzdryn | ................ | G06K 9/036 382/103 |
| 9,280,860 | B2 * | 3/2016 | Malhotra | ............. | A61B 5/1172 |
| 2008/0049987 | A1 * | 2/2008 | Champagne | ....... | G06K 9/00026 382/124 |
| 2010/0008545 | A1 * | 1/2010 | Ueki | .................. | G06K 9/00033 382/115 |
| 2014/0040128 | A1 * | 2/2014 | Park | .................... | G06Q 20/108 705/42 |

FOREIGN PATENT DOCUMENTS

KR 10-1317249 10/2013

* cited by examiner

*Primary Examiner* — Brian P Werner
(74) *Attorney, Agent, or Firm* — The Farrell Law Firm, P.C.

(57) ABSTRACT

A method of operating an electronic device is provided. The method includes detecting a plurality of fingerprint drags after a touch on a portion of the electronic device, wherein each of the plurality of fingerprint drags is a consecutive drag from a previous drag and each of the plurality of fingerprint drags has a different orientation from each other; and identifying a fingerprint based on a plurality of images acquired from the plurality of fingerprint drags, wherein each of the plurality of images is compared with corresponding portion of a reference image.

20 Claims, 13 Drawing Sheets

FINGERPRINT IDENTIFYING METHOD AND ELECTRONIC DEVICE THEREOF

PRIORITY

This application claims priority under 35 U.S.C. §119(a) to a Korean Patent Application filed on Mar. 26, 2014 in the Korean Intellectual Property Office and assigned Serial No. 10-2014-0035205, the entire contents of which are incorporated herein by reference.

BACKGROUND

1. Field of the Disclosure

The present disclosure relates generally to a fingerprint identifying method and an electronic device thereof, and more particularly, to a method of operating an electronic device for detecting a fingerprint swipe, and identifying a fingerprint based on an image acquired from the fingerprint swipe.

2. Description of the Related Art

As information communication technology and semiconductor technology advance, various electronic devices have been developed into multimedia devices for providing diverse multimedia services. For example, an electronic device can provide various multimedia services such as a messenger service, broadcasting service, wireless Internet service, camera service, and audio play service.

Recently, as personal privacy has become significant, an electronic device provides an enhanced security function such as a lock function. For example, an electronic device provides a fingerprint identification function. The fingerprint identification function identifies a particular person by comparing a fingerprint image input to the electronic device with a preset reference image based on a feature that the fingerprint differs from individual to individual.

Fingerprint input methods for fingerprint identification include a method for inputting a fingerprint to a fingerprint sensor using a swipe or a touch. The swipe type is subject to a low fingerprint identification rate, because the electronic device compares one fingerprint image input through the single swipe with the reference image. In addition, a user must put an electronic device down or use both hands in order to input the fingerprint.

SUMMARY

The present disclosure has been made to address at least the above-mentioned problems and/or disadvantages and to provide at least the advantages described below. Accordingly, an aspect of the present disclosure is to provide a fingerprint identification method and an electronic device for enhancing a fingerprint identification rate.

Another aspect of the present disclosure is to provide a fingerprint identification method and an electronic device for enhancing user convenience in fingerprint identification.

Another aspect of the present disclosure is to provide a fingerprint identification method and an electronic device for providing entertainment and various user interfaces based on a fingerprint input direction when the fingerprint is input.

According to an aspect of the present disclosure, a method of operating an electronic device is provided. The method includes detecting a detecting a plurality of fingerprint drags after a touch on a portion of the electronic device, wherein each of the plurality of fingerprint drags is a consecutive drag from a previous drag and each of the plurality of fingerprint drags has a different orientation from each other, and identifying a fingerprint based on a plurality of images acquired from the plurality of fingerprint drags, wherein each of the plurality of images is compared with a corresponding portion of a reference image.

According to another aspect of the present disclosure, an electronic device is provided. The electronic device includes a fingerprint sensor configured to detect a plurality of fingerprint drags after a touch on a portion of the electronic device, wherein each of the plurality of fingerprint drags is a consecutive drag from a previous drag and each of the plurality of fingerprint drags has a different orientation from each other, and a processor configured to identify a fingerprint based on a plurality of images acquired from the plurality of fingerprint drags, wherein each of the plurality of images is compared with a corresponding portion of a reference image.

According to another aspect of the present disclosure, a non-transitory computer-readable recording medium storing a program which executes a method of operating an electronic device is provided. The method includes detecting a plurality of fingerprint drags after a touch on a portion of the electronic device, wherein each of the plurality of fingerprint drags is a consecutive drag from a previous drag and each of the plurality of fingerprint drags has a different orientation from each other, and identifying a fingerprint based on a plurality of images acquired from the plurality of fingerprint drags, wherein each of the plurality of images is compared with a corresponding portion of a reference image.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION

Figure 1:
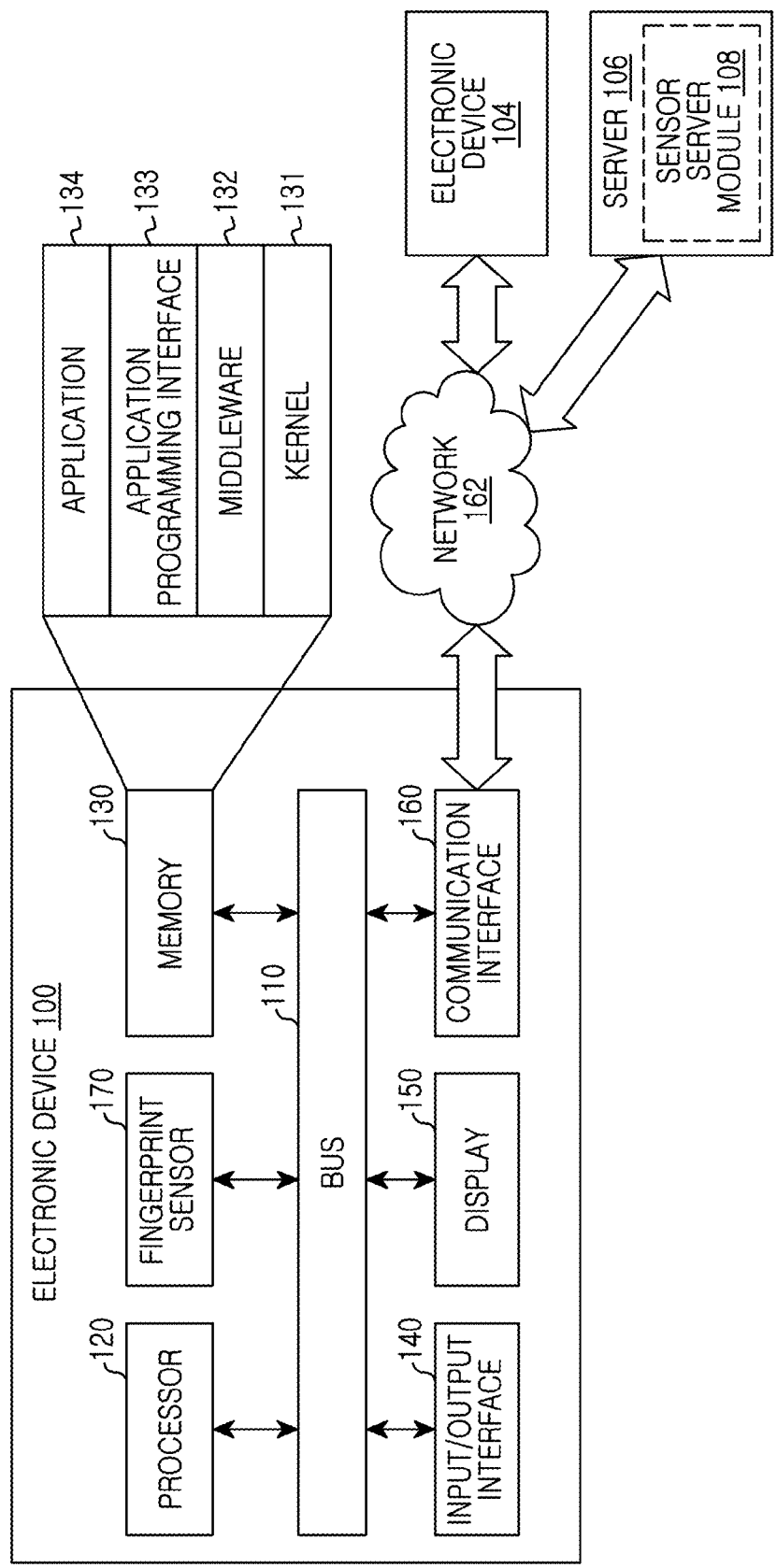
FIG. 1 is a block diagram of an electronic device according to an embodiment of the present disclosure.

The following description with reference to the accompanying drawings is provided to assist in a comprehensive understanding of embodiments of the present disclosure as defined by the appended claims and their equivalents. It includes various details to assist in that understanding but these are to be regarded as merely exemplary. Accordingly, those of ordinary skill in the art will recognize that various changes and modifications of the embodiments of the present disclosure described herein can be made without departing from the scope and spirit of the present disclosure. In addition, descriptions of well-known functions and constructions may be omitted for clarity and conciseness. Throughout the drawings, like reference numerals will be understood to refer to like parts, components and structures.

The terms and words used in the following description and appended claims are not limited to their dictionary meanings, but, are merely used to facilitate a clear and consistent understanding of the present disclosure. Accordingly, it should be apparent to those skilled in the art that the following description of embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, a reference to "a component surface" includes a reference to one or more of such surfaces.

By the term "substantially", it is indicated that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

The terms used herein are merely used to describe certain embodiments of the present disclosure, and are not intended to limit the present disclosure. An expression used in the singular encompasses the expression of the plural, unless it has a clearly different meaning in the context. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Although terms including ordinal numbers, such as "first" and "second," and the like, may be used to describe various components, such components are not limited by the above terms. The above terms are used only to distinguish one component from another. For example, a first component may be referred to as a second component without departing from the scope of the present disclosure, and likewise a second component may be referred to as a first component.

The term of "and/or" encompasses a combination of plural items or any one of the plural items.

In the case according to which a component is referred to as being "connected to" or "accessed by" another component, it should be understood that not only the component is directly connected to or accessed by the other component, but also there may exist another component between them. Meanwhile, in the case according to which a component is referred to as being "directly connected to" or "directly accessed by" another component, it should be understood that there is no component there between.

Unless defined otherwise, all terms used herein have the same meanings as commonly understood by those skilled in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to an embodiment of the present disclosure can be a device having fingerprint identification functionality. For example, an electronic device can include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, and a wearable device (e.g., a Head-Mounted-Device (HMD) such as electronic glasses, an electronic textiles, an electronic bracelet, an electronic necklace, an electronic appcessory, an electronic tattoo, and a smart watch).

An electronic device can be a smart home appliance having fingerprint identification functionality. The smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung Home-Sync™, AppleTV™, or Google TV™), game consoles, an electronic dictionary, a digital key, a camcorder, and a digital frame.

An electronic device can include at least one of various medical appliances (e.g., Magnetic Resonance Angiography (MRA), Magnetic Resonance Imaging (MRI), Computed Tomography (CT), X-ray system, ultrasonicator)), a navigation device, a Global Positioning System (GPS) receiver, an Event Data Recorder (EDR), a Flight Data Recorder (FDR), an in-vehicle infotainment device, marine electronic equipment (e.g., marine navigation device and gyro compass), avionics, a security device, and an industrial or home robot.

An electronic device can include at least one of part of furniture or building/structure having fingerprint identification functionality, an electronic board, an electronic signature receiving device, a projector, and various gauges (e.g., gauges for water, electricity, gas, and radio waves).

An electronic device can be one or a combination of those various devices. Those skilled in the art should understand that an electronic device of the present disclosure is not limited to those devices.

Embodiments of the present disclosure provide an electronic device by referring to the accompanying drawings. The term "user" can indicate a person or a device (e.g., an artificial intelligence electronic device) who or which uses an electronic device.

FIG. 1 is a block diagram of an electronic device according to an embodiment of the present disclosure.

Referring to FIG. 1, the electronic device 100 includes a bus 110, a processor 120, a memory 130, an input/output interface 140, a display 150, a communication interface 160, and a fingerprint sensor 170.

The bus 110 interlinks the components (e.g., the processor 120, the memory 130, the input/output interface 140, the display 150, the communication interface 160, and the fingerprint sensor 170) of the electronic device 100 and controls communications between the components.

The processor 120 receives an instruction from the components of the electronic device 100 via the bus 110, interprets the received instruction, and performs an operation or processes data according to the interpreted instruction. The processor 120 executes at least one program stored in the memory 130 and provides a service corresponding to the program. The processor 120 detects a fingerprint swipe through the fingerprint sensor 170 and recognizes a fingerprint based on an image acquired from the detected fingerprint swipe. The fingerprint swipe may include a plurality of fingerprint drags after a touch on a portion of the electronic device 100.

Figure 2A:
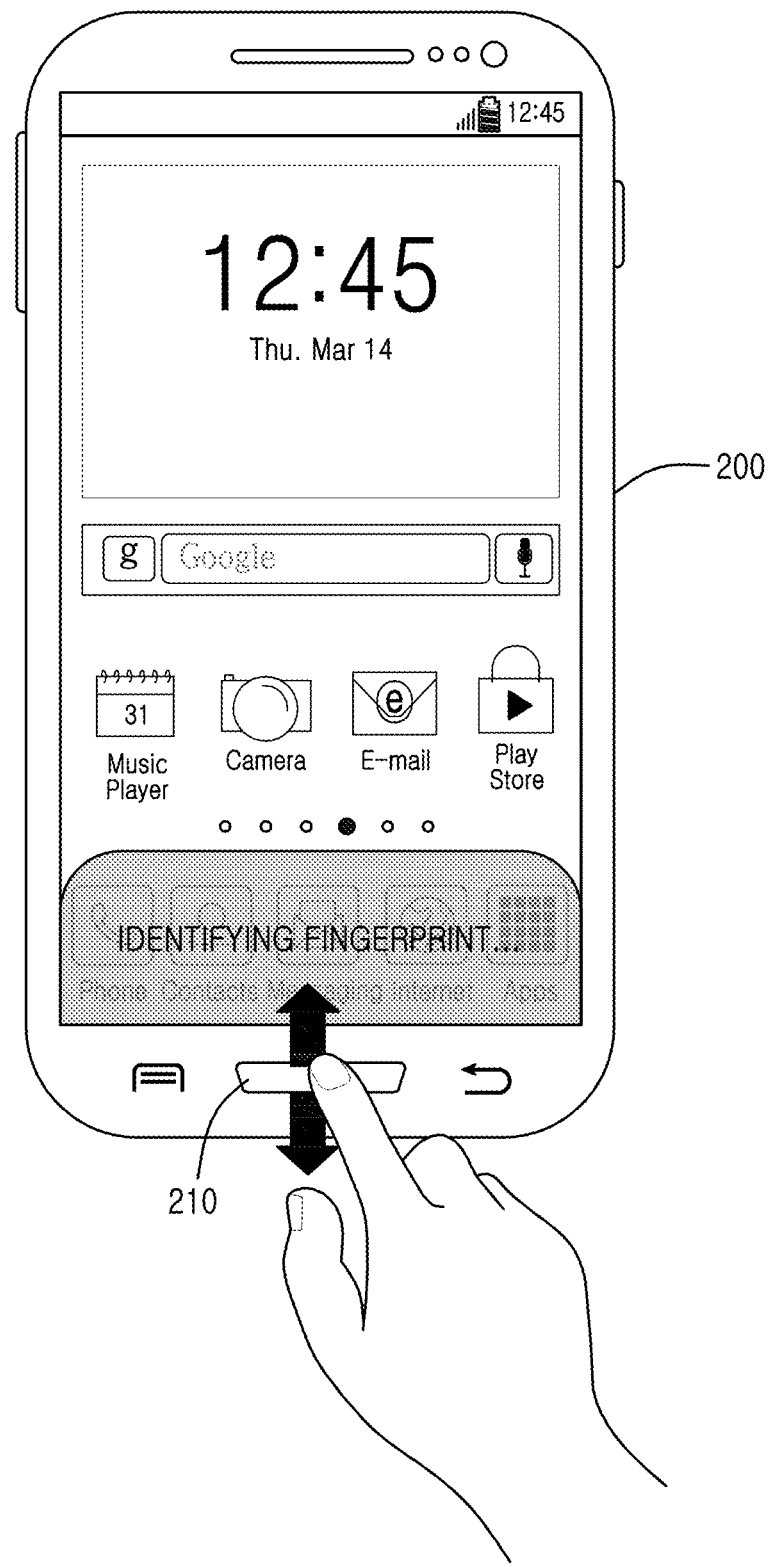
FIG. 2A illustrates fingerprint identification through a fingerprint swipe in an electronic device according to an embodiment of the present disclosure.
Figure 2B:
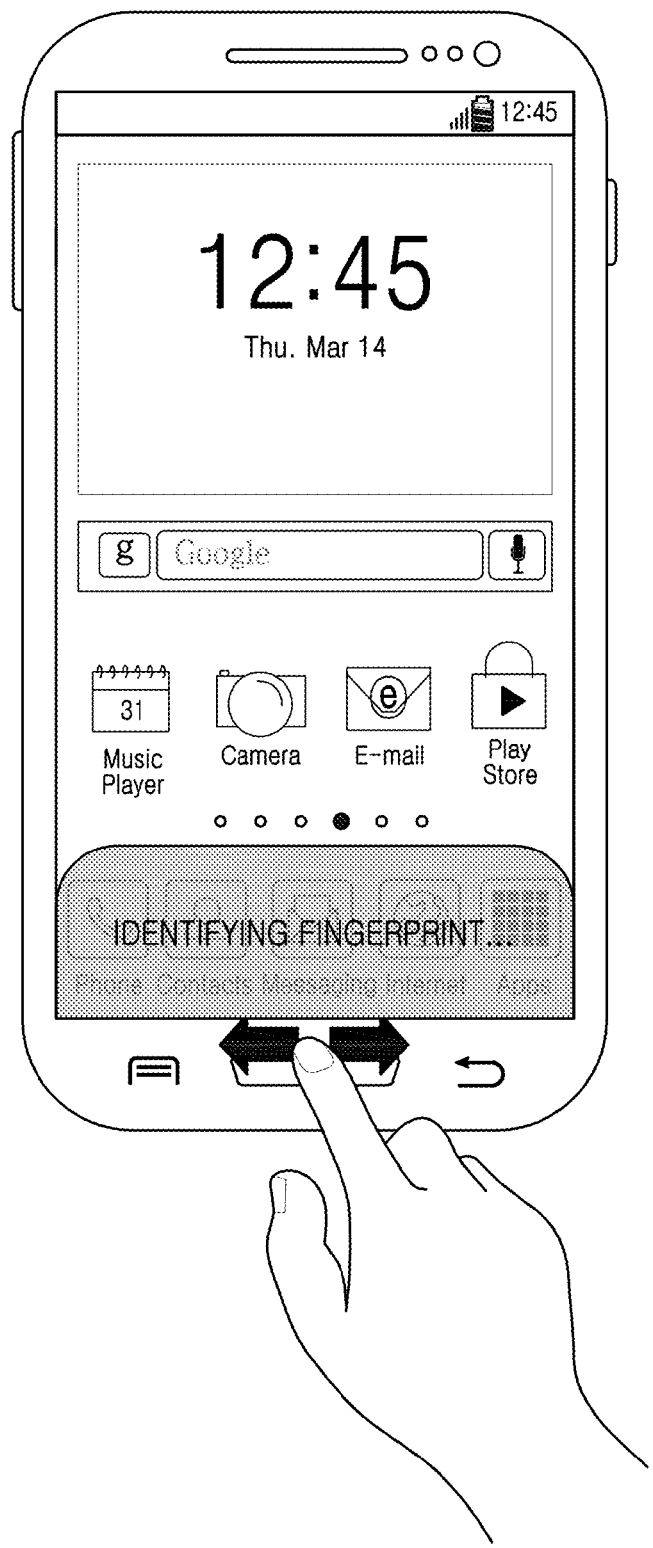
FIG. 2B illustrates fingerprint identification through a fingerprint swipe in an electronic device according to an embodiment of the present disclosure.

The fingerprint sensor 170 can be included in a home button 210 as shown in FIG. 2A. The processor 120 detects the fingerprint swipe on a surface of the home button 210 through the fingerprint sensor 170. For example, the processor 210 can detect, but is not limited to, a vertical fingerprint swipe of FIG. 2A and a horizontal fingerprint swipe of FIG. 2B. The processor 120 can detect a fingerprint swipe in a diagonal direction (or orientation) or in a certain pattern. The processor 120 can continuously detect a fingerprint swipe during a reference time.

The processor 120 obtains one or more fingerprint images according to a number of fingerprint swipes, and identifies a fingerprint by matching an obtained fingerprint image and a preset reference image. For example, when one or more fingerprint images obtained match one or more reference images, the processor 120 identifies the fingerprint. For example, the processor 120 continuously detects a fingerprint swipe during a reference time and compares images sequentially obtained to preset reference images in real time.

Figure 4:
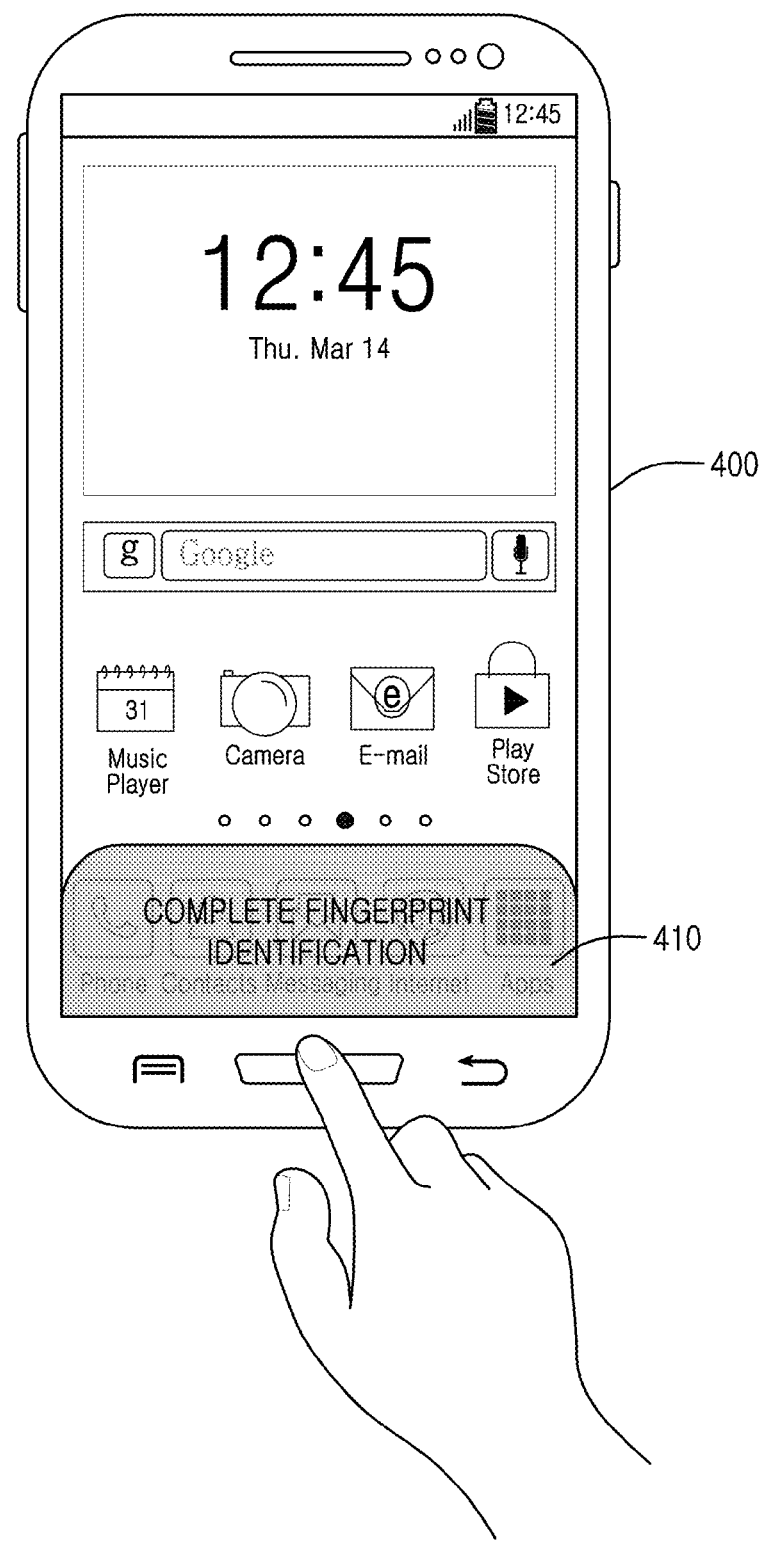
FIG. 4 illustrates a screen when a fingerprint is identified in an electronic device according to an embodiment of the present disclosure.

Upon identifying a fingerprint, the processor 120 outputs a fingerprint identification notice 410 using one or more of a Light Emitting Diode (LED), a vibration, and a popup as shown in FIG. 4. For example, in response to a fingerprint identification, the processor 120 controls any one of a screen unlock function, a security setting function, an information transport function, and an electronic payment function. For example, the processor 120 requests a certain number of fingerprint swipe inputs and requests a minimum number of fingerprint swipe inputs for enhancing a fingerprint identification rate.

The processor 120 can include one or more Application Processors (APs) and one or more Communication Processors (CPs). An AP and a CP can be included in the processor 120 or in different Integrated Circuit (IC) packages. An AP and a CP may be included in a single IC package.

An AP can control hardware or software components connected to the AP by driving an operating system or an application program, and carry out data processing and operations including multimedia data. For example, the AP can be implemented using a System on Chip (SoC).

The CP can perform at least part of a multimedia control function. The CP can determine and authenticate a device in a communication network using a Subscriber Identity Module (SIM) card. In so doing, the CP can provide a user with services including voice telephony, video telephony, text message, and packet data. The CP can control data transmission and reception of the communication interface 160.

The AP or the CP can load and process an instruction or data received from its non-volatile memory or at least one of the other components in a volatile memory. The AP or the CP can store data received from or generated by at least one of the other components in a non-volatile memory.

The CP can manage data links and convert a communication protocol in a communication between an electronic device including hardware and other electronic devices connected over a network. The CP can be implemented using an SoC.

The processor 120 can include one or more data processors, an image processor, and a codec. The electronic device 100 can separately include a data processor, an image processor, or a codec. The processor 120 can further include a Graphics Processing Unit (GPU).

The memory 130 can store an instruction or data received from or generated by one or more components (e.g., the processor 120, the input/output interface 140, the display 150, the communication interface 160, and the fingerprint sensor 170) of the electronic device 100.

The memory 130 can store one or more programs for a service of the electronic device 100. For example, the memory 130 includes a kernel 131, a middleware 132, an Application Programming Interface (API) 133, and an application 134. The program can be implemented using a program module, and the programming module can be implemented using software, firmware, and hardware, or a combination of at least two of them.

The kernel 131 controls or manages system resources (e.g., the bus 110, the processor 120, and the memory 130) used to execute an operation or a function of the other programming modules (e.g., the middleware 132, the API 133, or the application 134). Also, the kernel 131 provides an interface allowing the middleware 132, the API 133, or the application 134 to access, control, or manage the individual components of the electronic device 100.

The middleware 132 relays data between the API 133, the application 134, or the kernel 131. The middleware 132 can load-balance task requests received from at least one application by giving priority of a system resource (e.g., the bus 110, the processor 120, or the memory 130) of the electronic device 100 to the task requests.

The API 133, which is an interface for the application 134 to control a function provided from the kernel 131 or the middleware 132, can include at least one interface or function (e.g., instruction) for, for example, file control, window control, image processing, or text control.

The application 134 can include a Short Message Service (SMS)/Multimedia Messaging Service (MMS) application, an e-mail application, a calendar application, an alarm application, a health care application (e.g., an application for measuring an amount of exercise, a blood sugar level, and/or the like), or an environmental information application (e.g., an application for providing air pressure, humidity, temperature information, and/or the like). Additionally or alternatively, the application 134 can be involved in information exchange between the electronic device 100 and an external electronic device 104. The information exchange application can include, for example, a notification relay application for relaying certain information to an external electronic device or a device management application for managing an external electronic device.

For example, the notification relay application can relay notification information of another application (e.g., an SMS/MMS application, an e-mail application, a health care application, an environmental information application, and/or the like) of the electronic device 100 to the external electronic device 104. Additionally or alternatively, a notification relay application can receive and provide notification information from the external electronic device 104 to a user. A device management application can turn on/off at least part of a function (e.g., the external electronic device 104 (or some other components)) of the external electronic device 104 communicating with the electronic device 100, control brightness (or resolution) of the display 150, and manage (e.g., install, delete, or update) a service (e.g., a call service or a messaging service) provided by an application of the external electronic device 104 or by the external electronic device 104 itself.

The application 134 can include an application designated based on an attribute (e.g., a type of an electronic device) of the external electronic device 104. For example, when an external electronic device is an MP3 player, the application 134 can include a music playing application. Similarly, when an external electronic device is a mobile medical device, the application 134 can include a health care application. The application 134 can include at least one of an application designated in the electronic device 100 and an application received from an external electronic device (e.g., a server 106 and/or the electronic device 104).

The memory 130 can include an internal memory or an external memory. The internal memory can include at least one of, for example, volatile memory (e.g., Dynamic Random Access Memory (DRAM), Static RAM (SRAM), Synchronous Dynamic RAM (SDRAM)) or non-volatile memory (e.g., One-Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, NOR flash memory). The internal memory may employ a Solid State Drive (SSD).

The external memory can include at least one of a Compact Flash (CF) memory card, a Secure Digital (SD) memory card, a Micro-SD memory card, a Mini-SD memory card, an extreme digital (xD) memory card, or a memory stick.

The input/output interface 140 forwards an instruction or data input from a user through an input/output device (e.g., a sensor, a keyboard, or a touch screen) to, for example, the processor 120, the memory 130, the communication interface 160, or the fingerprint sensor 170 via the bus 110. For example, the input/output interface 140 forwards data of a user's touch input through a touch screen, to the processor 120. For example, the input/output interface 140 outputs an instruction or data received from the processor 120, the memory 130, the communication interface 160, or the fingerprint sensor 170 via the bus 110, through an input/output device (e.g., a speaker or a display). For example, the input/output interface 140 outputs voice data processed by the processor 120 to a user through a speaker.

The display 150 displays various information (e.g., multimedia data or text data) to a user.

The communication interface 160 establishes communication between the electronic device 100 and an external device (e.g., the electronic device 104 or the server 106). For example, the communication interface 160 communicates with an external device over the network 162 using wireless communication or wired communication. The wireless communication can include at least one of, for example, Wireless Fidelity (WiFi), Bluetooth (BT), Near Field Communication (NFC), GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), WiBro, or Global System for Mobile communications (GSM)). The wired communication can include at least one of, for example, a Universal Serial Bus (USB), a High Definition Multimedia Interface (HDMI), a Recommended Standard (RS) 232, a Plain Old Telephone Service (POTS), and/or the like.

The network 162 can be the communication network. The communication network can include at least one of a computer network, the Internet, the Internet of Things (IoT), and a telephone network. The protocol (e.g., transport layer protocol, data link protocol, or physical layer protocol) for the communication between the electronic device 100 and an external device can be supported by at least one of the application 134, the API 133, the middleware 132, the kernel 131, and the communication interface 160.

The server 106 supports the electronic device 100 by conducting at least one of the operations (or the functions) of the electronic device 100. For example, the server 106 can include a sensor server module 108 for supporting the fingerprint sensor 170 of the electronic device 100. The sensor server module 108 can include at least one component of the fingerprint sensor 170 and perform (e.g., act as a substitute for) at least one of the operations of the fingerprint sensor 170.

The fingerprint sensor 170 can include any one of optical, thermal, capacitive, or electric field fingerprint sensors. For example, the fingerprint sensor 170 detects a touch or a swipe of a fingerprint and receives fingerprint data. The fingerprint sensor 170 generates a fingerprint image corresponding to a finger touching a surface of the fingerprint sensor 170. For example, the fingerprint sensor 170 generates a fingerprint image corresponding to a fingerprint pattern based on currents varying based on a finger contacting the surface of the sensor.

The fingerprint sensor 170 extracts feature points by reading a fingerprint in a user registration procedure, and stores them in the memory 130. The fingerprint sensor 170 detects a fingerprint swipe and thus obtains one or more fingerprint images. For example, upon detecting a fingerprint swipe, the fingerprint sensor 170 compares one or more images obtained from the fingerprint swipe to one or more original preset images. The fingerprint sensor 170 can be included in the home button of the electronic device 100.

At least one part of the fingerprint sensor 170 can be included in the server 106 (e.g., the sensor server module 108), and the server 106 can support at least one operation of the fingerprint sensor 170.

The electronic device 100 can further include a sensor module. The sensor module can include at least one of a gesture sensor, a gyro sensor, an atmospheric pressure sensor, a magnetic sensor, an acceleration sensor, a grip sensor, a proximity sensor, a color sensor, a biometric sensor, a temperature sensor, a humidity sensor, a light sensor, and an UltraViolet (UV) light sensor.

The sensor module measures a physical quantity or detects an operation status of the electronic device 100, and converts the measured or detected information to an electrical signal. The sensor module can include an Electronic Nose (E-nose) sensor, an ElectroMyoGraphy (EMG) sensor, an ElectroEncephaloGram (EEG) sensor, and an ElectroCardioGram (ECG) sensor.

The names of the components of the electronic device 100 can differ according to the type of the electronic device. The electronic device 100 can include one or more of the components, omit some components, or further include other components according to its type.

An electronic device can include a fingerprint sensor for detecting a fingerprint swipe, and a processor for identifying a fingerprint based on an image acquired from the fingerprint swipe.

The processor can continuously detect the fingerprint swipe through the fingerprint sensor during a reference time.

The processor can consecutively acquire the image through the fingerprint sensor.

The processor can identify the fingerprint by determining whether the image consecutively acquired matches a preset reference image.

The processor can determine a direction of the fingerprint swipe and execute an application designated in the direction.

The processor can determine an icon display location of the application based on the direction.

When detecting the fingerprint swipe, the processor can display a content based on movement of the fingerprint swipe.

When identifying the fingerprint, the processor can execute one of a screen unlock function, a security setting function, an information transport function, and an electronic payment function.

When identifying the fingerprint, the processor can output a fingerprint identification notice using one or more of a sound, a Light Emitting Diode (LED), a vibration, and a popup.

The fingerprint sensor can be included in a home button of the electronic device.

Figure 5:
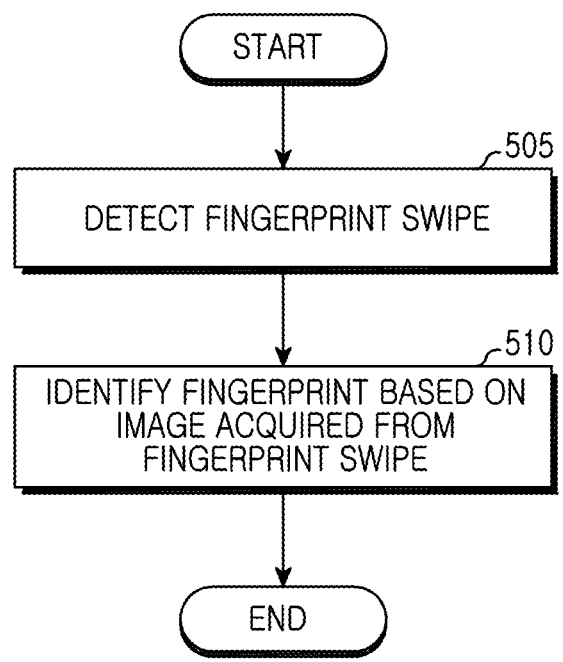
FIG. 5 is a flowchart of a method of identifying a fingerprint through a fingerprint swipe in an electronic device according to an embodiment of the present disclosure.

FIG. 5 is a flowchart of a method of identifying a fingerprint through a fingerprint swipe in an electronic device according to an embodiment of the present disclosure.

Referring to FIG. 5, the electronic device detects a fingerprint swipe in step 500. The fingerprint sensor can be included in the home button 210 of an electronic device 200 as shown in FIG. 2A. The electronic device 200 detects the fingerprint swipe on the surface of the home button 210 through the fingerprint sensor. For example, the electronic device 200 can detect, but is not limited to, a vertical fingerprint swipe of FIG. 2A and a horizontal fingerprint swipe of FIG. 2B. The electronic device 200 can detect the fingerprint swipe in a diagonal direction or in a certain pattern. The electronic device 200 can continuously detect a fingerprint swipe during a reference time.

In step 510, the electronic device identifies a fingerprint based on the image obtained from the fingerprint swipe. The electronic device can acquire one or more fingerprint images according to the number of the fingerprint swipes, and identify the fingerprint by matching the acquired fingerprint image to a preset reference image. For example, when the one or more acquired fingerprint images match one or more reference images, the electronic device identifies the fingerprint. The electronic device can continuously detect the fingerprint swipe during the reference time and match the images sequentially acquired with the preset reference images in real time.

After identifying a fingerprint, the electronic device 400 outputs a fingerprint identification notice 410 using one or more of an LED, a vibration, and a popup as shown in FIG. 4. For example, in response to a fingerprint identification, the electronic device 400 controls any one of a screen unlock function, a security setting function, an information transport function, and an electronic payment function. For example, an electronic device can request a certain number of fingerprint swipe inputs, and request a minimum number of fingerprint swipe inputs for enhancing the fingerprint identification rate.

Figure 6:
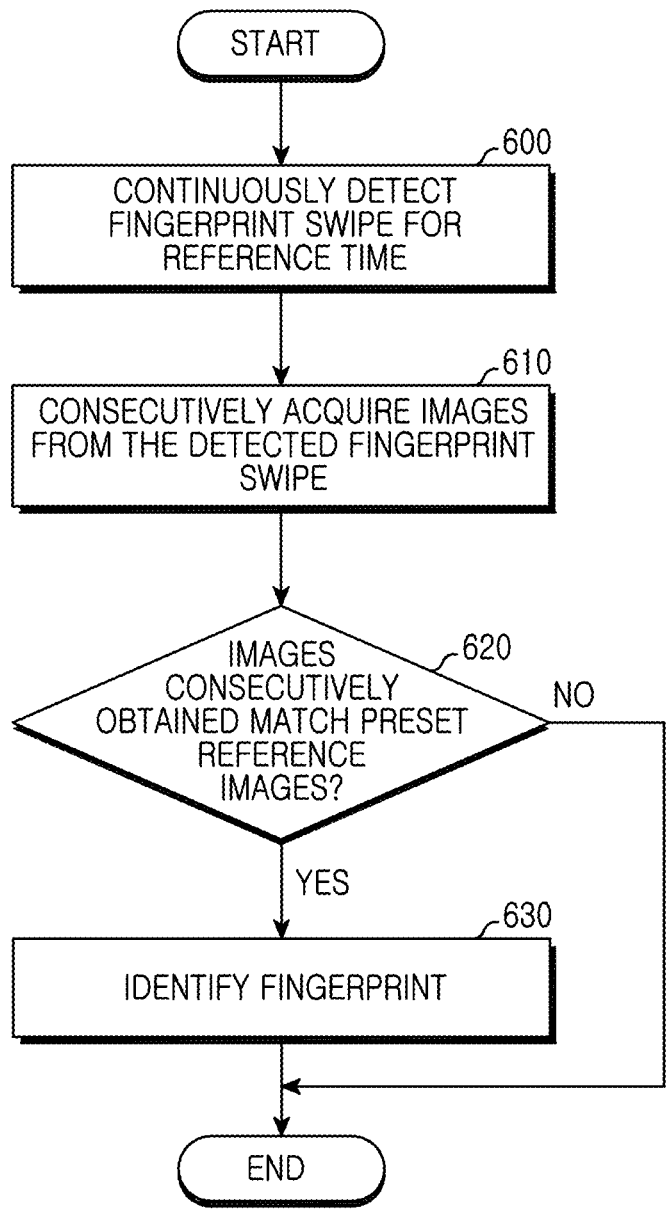
FIG. 6 is a flowchart of a method of identifying a fingerprint through a fingerprint swipe in an electronic device according to an embodiment of the present disclosure.

FIG. 6 is a flowchart of a method of identifying a fingerprint through a fingerprint swipe in an electronic device according to an embodiment of the present disclosure.

Referring to FIG. 6, the electronic device continuously detects a fingerprint swipe for a reference time in step 600. The fingerprint sensor can be included in the home button 210 of the electronic device 200 as shown in FIG. 2A. The electronic device 200 can detect the fingerprint swipe on the surface of the home button 210 through the fingerprint sensor. For example, the electronic device 200 can detect, but is not limited to, a vertical fingerprint swipe of FIG. 2A and a horizontal fingerprint swipe of FIG. 2B. The electronic device 200 can detect the fingerprint swipe in a diagonal direction or in a certain pattern.

Figure 7:
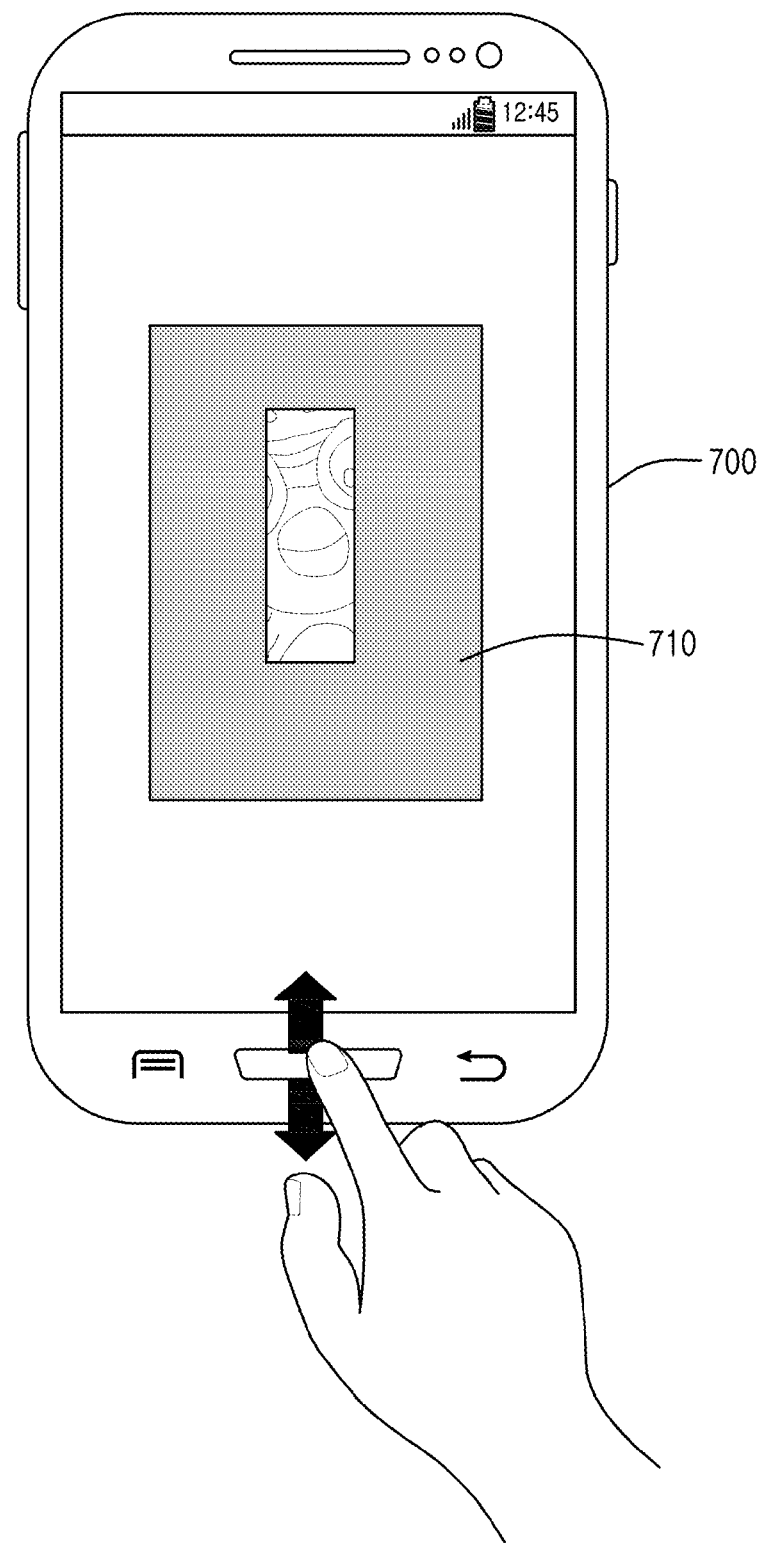
FIG. 7 illustrates a screen when a fingerprint is input to an electronic device according to an embodiment of the present disclosure.

After identifying a fingerprint, an electronic device 700 displays a content 710 based on the movement of the fingerprint swipe as shown in FIG. 7. For example, the electronic device 700 can gradually display at least part of the content 710 according to the movement of the fingerprint swipe. When detecting a vertical fingerprint swipe, the electronic device 700 can vertically display at least part of the content 710 in a certain area of the hidden content 710. The electronic device 700 can detect the fingerprint swipe and concurrently provide the user with a visual effect or an auditory effect of scratching a lottery ticket. For example, although the electronic device 700 can provide, but is not limited to, the scratching effect for the fingerprint swipe, it can provide various effects of cleaning a steamy window, gradually clearing an object, and gradually blurring an object.

Figure 3:
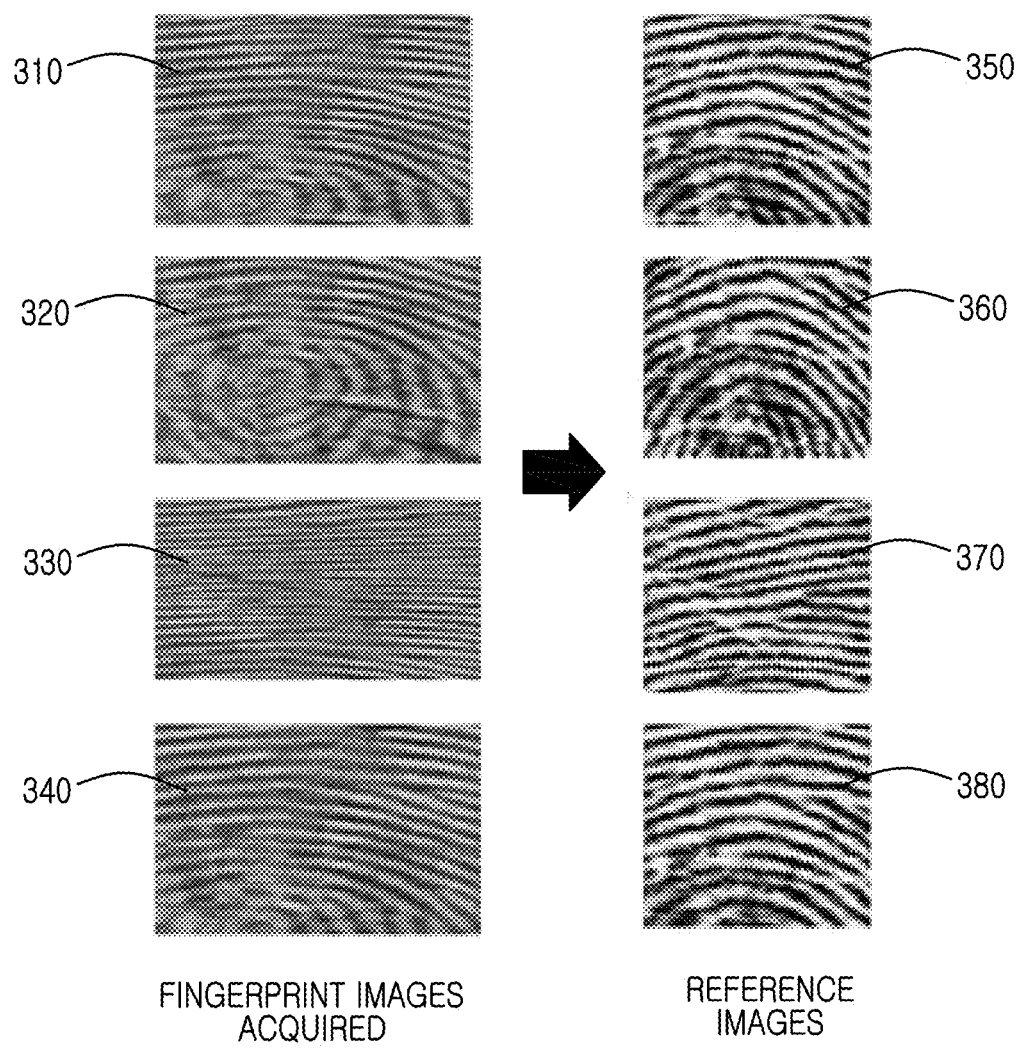
FIG. 3 illustrates fingerprint images obtained and reference images in an electronic device according to an embodiment of the present disclosure.

In step 610, the electronic device sequentially obtains images from the detected fingerprint swipe. The electronic device can acquire one or more fingerprint images according to the number of the fingerprint swipes as shown in FIG. 3. For example, when the fingerprint is swiped, but is not limited to, four times, the electronic device acquires four different fingerprint images 310 through 340. The number of the fingerprint swipes can vary, and accordingly various fingerprint images can be acquired. The electronic device can limit the number of the fingerprint swipes for the fingerprint identification.

In step 620, the electronic device determines whether the images consecutively obtained match the preset reference images. The electronic device determines whether the acquired fingerprint images 310 through 340 match the preset reference images 350 through 380 as shown in FIG. 3. For example, the electronic device determines whether the fingerprint images 310 through 340 match the preset reference images 350 through 380 over a reference rate. For example, the electronic device determines whether one or more of the four fingerprint images 310 through 340 matches one or more of the reference images 350 through 380 over the reference rate.

When the consecutive images match the preset reference images, the electronic device identifies a fingerprint in step 630. After identifying the fingerprint, the electronic device 400 outputs a fingerprint identification notice 410 using one or more of an LED, a vibration, and a popup as shown in FIG. 4. For example, in response to a fingerprint identification, the electronic device 400 controls any one of a screen unlock function, a security setting function, an information transport function, and an electronic payment function.

Figure 8:
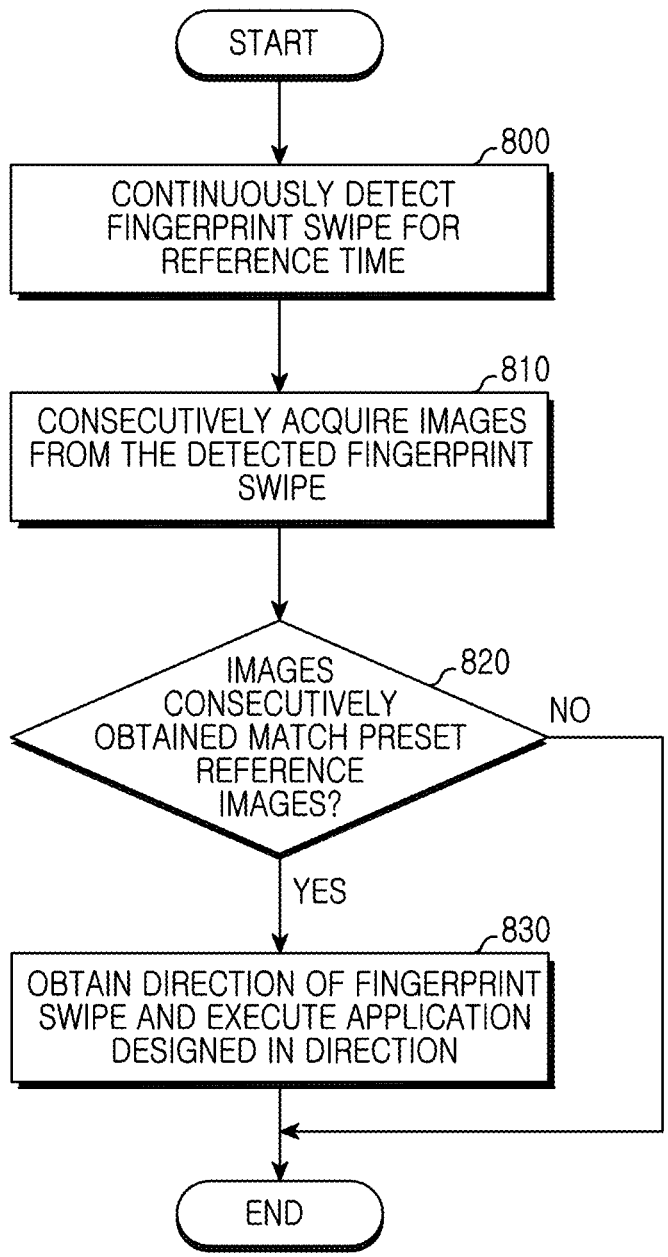
FIG. 8 is a flowchart of a method of executing a preset application based on a fingerprint swipe in an electronic device according to an embodiment of the present disclosure.

FIG. 8 is a flowchart of a method of executing a preset application based on a fingerprint swipe in an electronic device according to an embodiment of the present disclosure.

Referring to FIG. 8, the electronic device continuously detects a fingerprint swipe for a reference time in step 800. The fingerprint sensor can be included in the home button 210 of the electronic device 200 as shown in FIG. 2A. The electronic device 200 can detect the fingerprint swipe on the surface of the home button 210 through the fingerprint sensor. For example, the electronic device 200 can detect, but is not limited to, a vertical fingerprint swipe of FIG. 2A and a horizontal fingerprint swipe of FIG. 2B. The electronic device can detect the fingerprint swipe in a diagonal direction or in a certain pattern.

In step 810, the electronic device sequentially obtains images from the detected fingerprint swipe. The electronic device acquires one or more fingerprint images according to the number of the fingerprint swipes as shown in FIG. 3. For example, when the fingerprint is swiped, but is not limited to, four times, the electronic device acquires four different fingerprint images 310 through 340. The number of the fingerprint swipes can vary and accordingly various fingerprint images can be acquired. The number of the fingerprint swipes can be limited.

In step 820, the electronic device determines whether the consecutively obtained images match preset reference images. The electronic device determines whether the acquired fingerprint images 310 through 340 match the preset reference images 350 through 380 as shown in FIG. 3. For example, the electronic device determines whether the fingerprint images 310 through 340 match the preset reference images 350 through 380 over a reference rate. For example, the electronic device determines whether one or more of the four fingerprint images 310 through 340 match one or more of the reference images 350 through 380 over the reference rate.

Figure 9A:
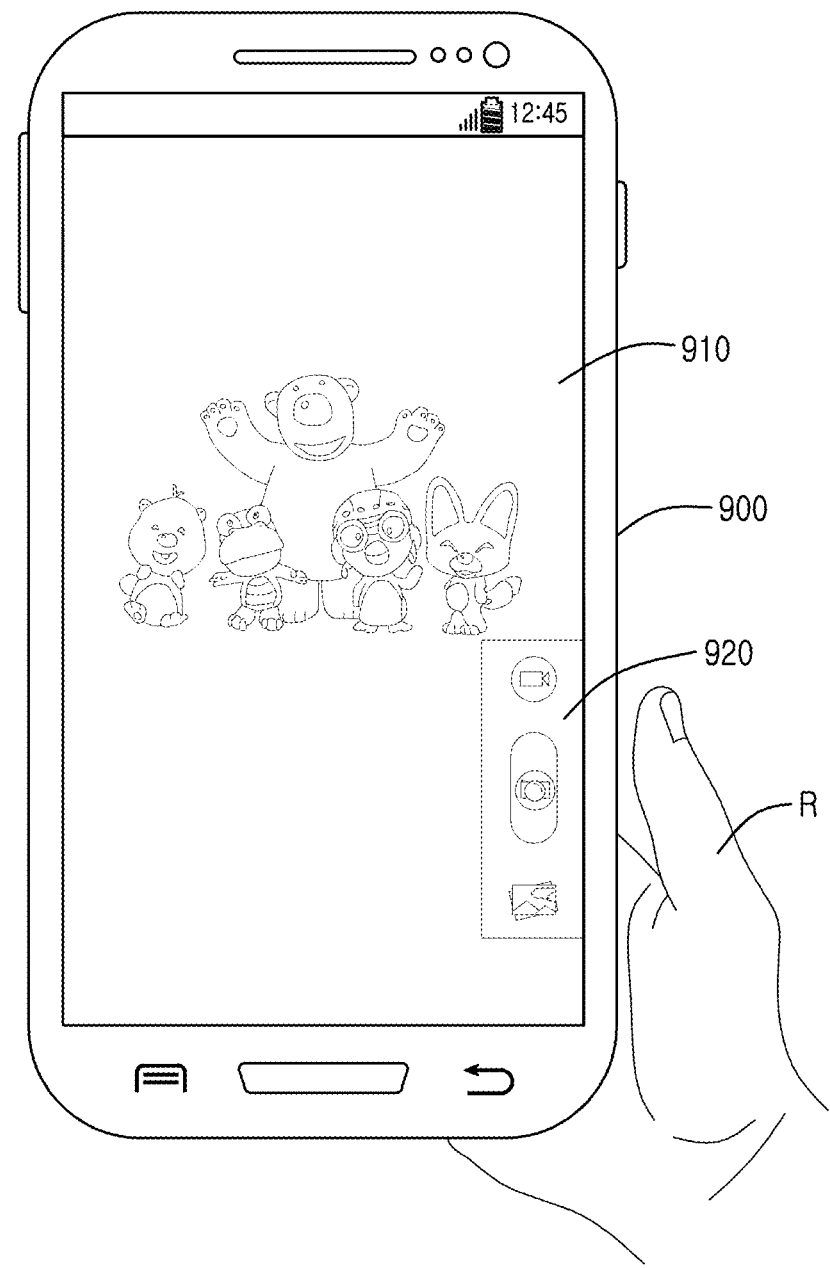
FIG. 9A illustrates a screen of a running application based on a fingerprint swipe direction in an electronic device according to an embodiment of the present disclosure.

When the consecutively obtained images match the preset reference images, the electronic device obtains the direction of the fingerprint swipe and executes an application designed for the direction in step 830. An electronic device 900 can execute a camera application 910 according to the direction of the fingerprint swipe as shown in FIG. 9A. For example, the electronic device 900 can determine a display location of an icon 920 of the application 910 based on the direction of the fingerprint swipe. The electronic device 900 can determine a user's grip status using the fingerprint image input through the fingerprint swipe. When the user holds the electronic device 900 with a right hand R and swipes the fingerprint, the electronic device 900 can move the icon 920 of the camera application 910 toward the right hand R holding the electronic device 900.

Figure 9B:
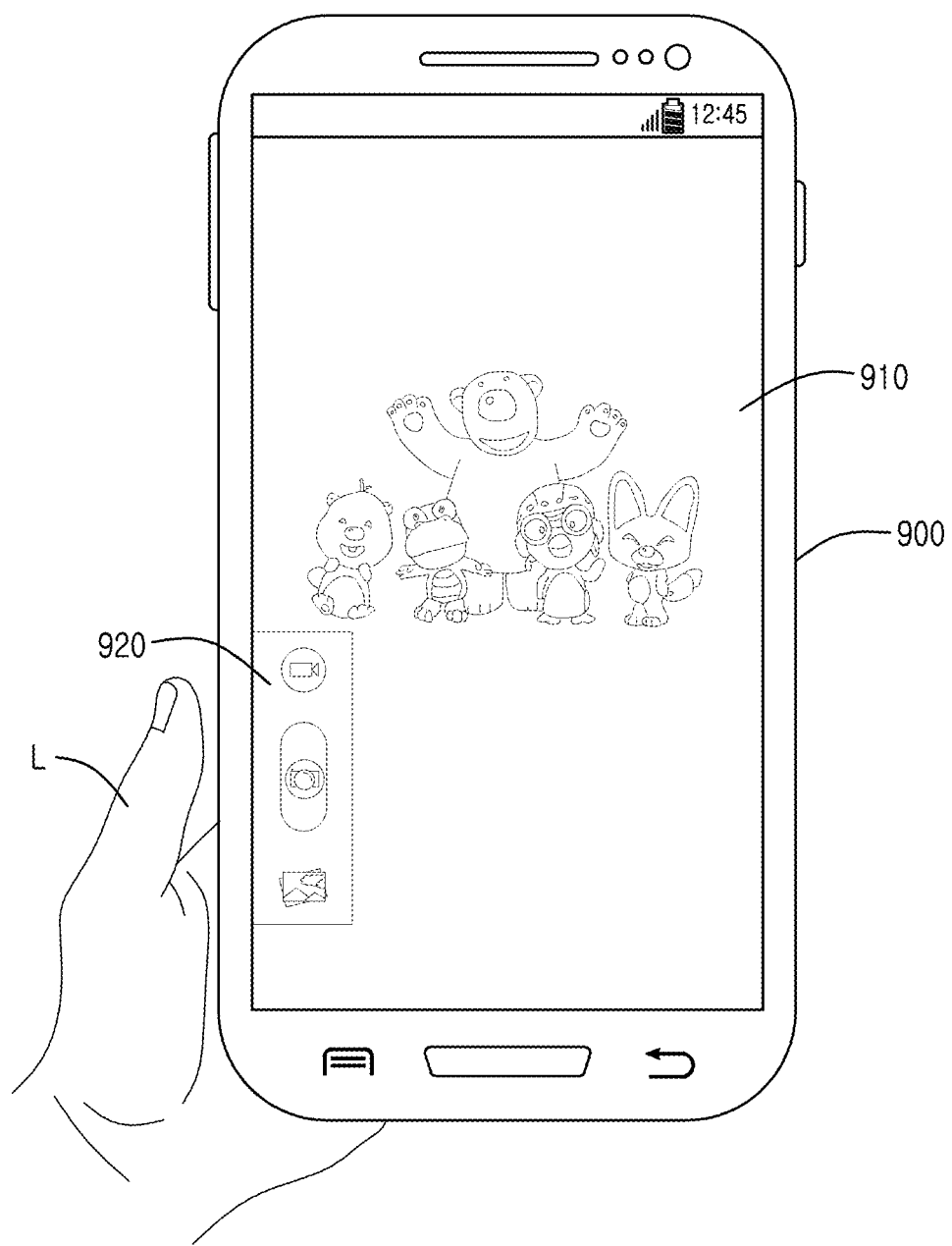
FIG. 9B illustrates a screen of a running application based on a fingerprint swipe direction in the electronic device according to an embodiment of the present disclosure.

When the user grips the electronic device 900 with a left hand L and swipes the fingerprint, the electronic device 900 can move the icon 920 of the camera application 910 toward the left hand L holding the electronic device 900 as shown in FIG. 9B. Various applications can be executed based on the direction of the fingerprint swipe, and the icon of the executed application can be moved to the designated location.

Figure 10:
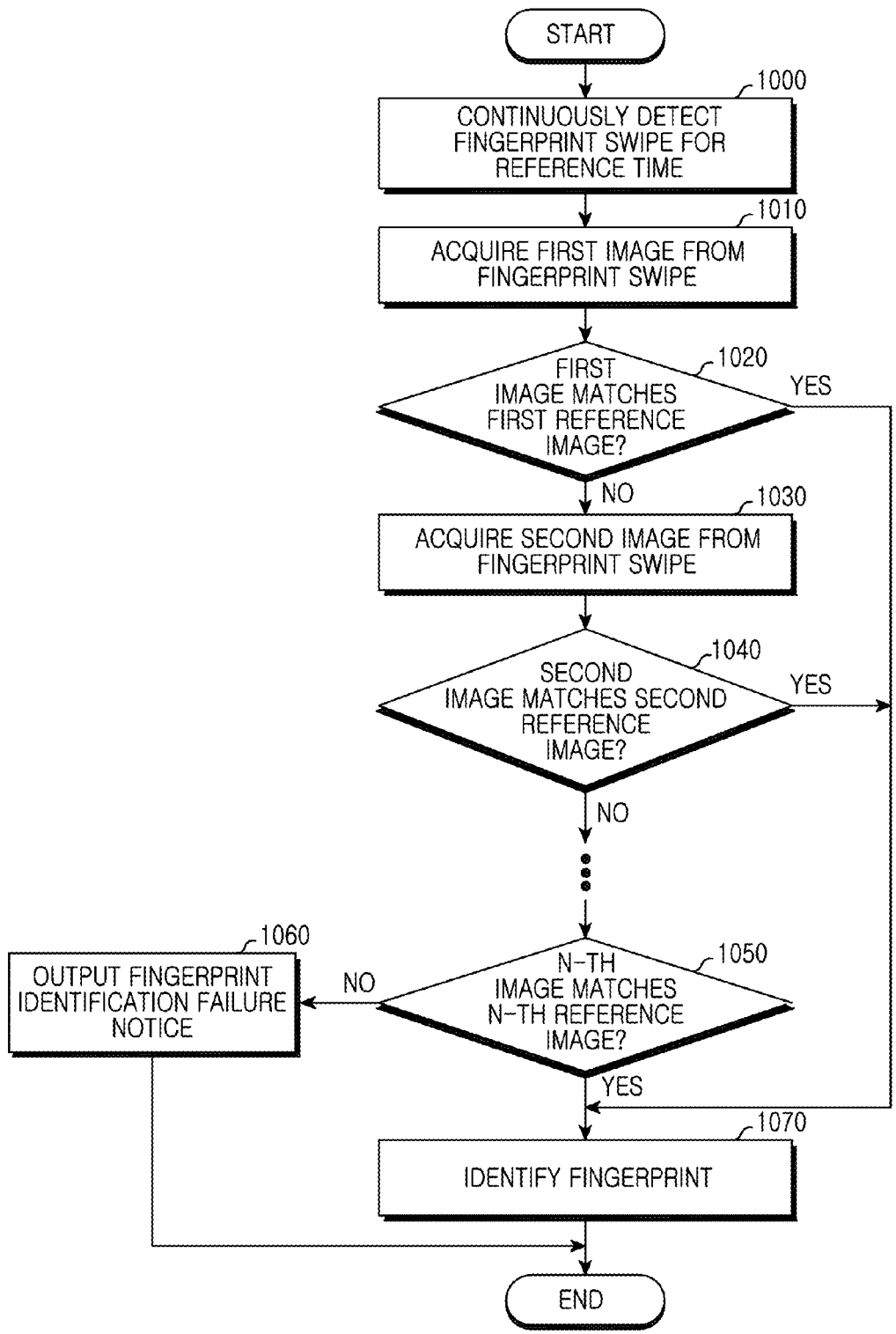
FIG. 10 is a flowchart of a method of identifying a fingerprint through a fingerprint swipe in an electronic device according to an embodiment of the present disclosure.

FIG. 10 is a flowchart of a method of identifying a fingerprint through a fingerprint swipe in an electronic device according to an embodiment of the present disclosure.

Referring to FIG. 10, the electronic device continuously detects the fingerprint swipe for a reference time in step 1000. The fingerprint sensor can be included in the home button 210 of the electronic device 200 as shown in FIG. 2A. The electronic device 200 can detect the fingerprint swipe on the surface of the home button 210 through the fingerprint sensor. For example, the electronic device 200 detects, but is not limited to, a vertical fingerprint swipe of FIG. 2A and a horizontal fingerprint swipe of FIG. 2B. The electronic device 200 detects the fingerprint swipe in the diagonal direction or in a certain pattern.

In step 1010, the electronic device acquires a first image from the fingerprint swipe. The electronic device acquires a first fingerprint image from the first fingerprint swipe.

In step 1020, the electronic device determines whether the first image matches a first reference image being preset. The electronic device determines whether the first image matches the first reference image over the reference rate.

When the first image matches the first reference image preset, the electronic device identifies the fingerprint in step 1070.

When the first image does not match the first reference image, the electronic device acquires a second image from the fingerprint swipe in step 1030. The electronic device acquires a second fingerprint image from the second fingerprint swipe.

In step 1040, the electronic device determines whether the second image matches a second reference image being preset. The electronic device determines whether the second image matches the second reference image over a reference rate.

When the second image matches the second reference image preset, the electronic device identifies a fingerprint in step 1070.

When the second image does not match the second reference image, the electronic device repeats steps 1030 and 1040. For example, the electronic device determines whether an N-th image acquired from the fingerprint swipe matches an N-th preset reference image in step 1050. The electronic device can limit the number of fingerprint swipes for the fingerprint identification.

When the N-th image does not match the N-th reference image, the electronic device outputs a fingerprint identification failure notice in step 1060. When the fingerprint identification fails, the electronic device outputs the fingerprint identification failure notice using one or more of an LED, a vibration, and a popup.

When the N-th image matches the N-th reference image, the electronic device identifies a fingerprint in step 1070. Upon identifying a fingerprint, the electronic device outputs the fingerprint identification notice 410 using one or more of an LED, a vibration, and a popup. When identifying a fingerprint, the electronic device controls any one of a screen unlock function, a security setting function, an information transport function, and an electronic payment function.

The electronic device can continuously detect the fingerprint swipe during the reference time and match the images sequentially acquired with the preset reference images in real time. The electronic device can request a certain number of fingerprint swipe inputs, and request a minimum number of fingerprint swipe inputs for enhancing a fingerprint identification rate.

A method of operating an electronic device can include detecting a fingerprint swipe, and identifying a fingerprint based on an image acquired from the fingerprint swipe.

A fingerprint swipe can be continuously detected through a fingerprint sensor during a reference time.

The image can be consecutively acquired through the fingerprint sensor.

Identifying a fingerprint is determined when the image consecutively acquired matches a preset reference image.

The method can further include determining a direction of a fingerprint swipe and executing an application designated for the direction.

The execution of an application for a designated direction can determine an icon display location of the application based on the direction.

The method can further include, when detecting a fingerprint swipe, displaying a content based on movement of the fingerprint swipe.

The method can further include, when identifying a fingerprint, executing one of a screen unlock function, a security setting function, an information transport function, and an electronic payment function.

The method can further include, when identifying a fingerprint, outputting a fingerprint identification notice using one or more of a sound, an LED, a vibration, and a popup.

Figure 11:
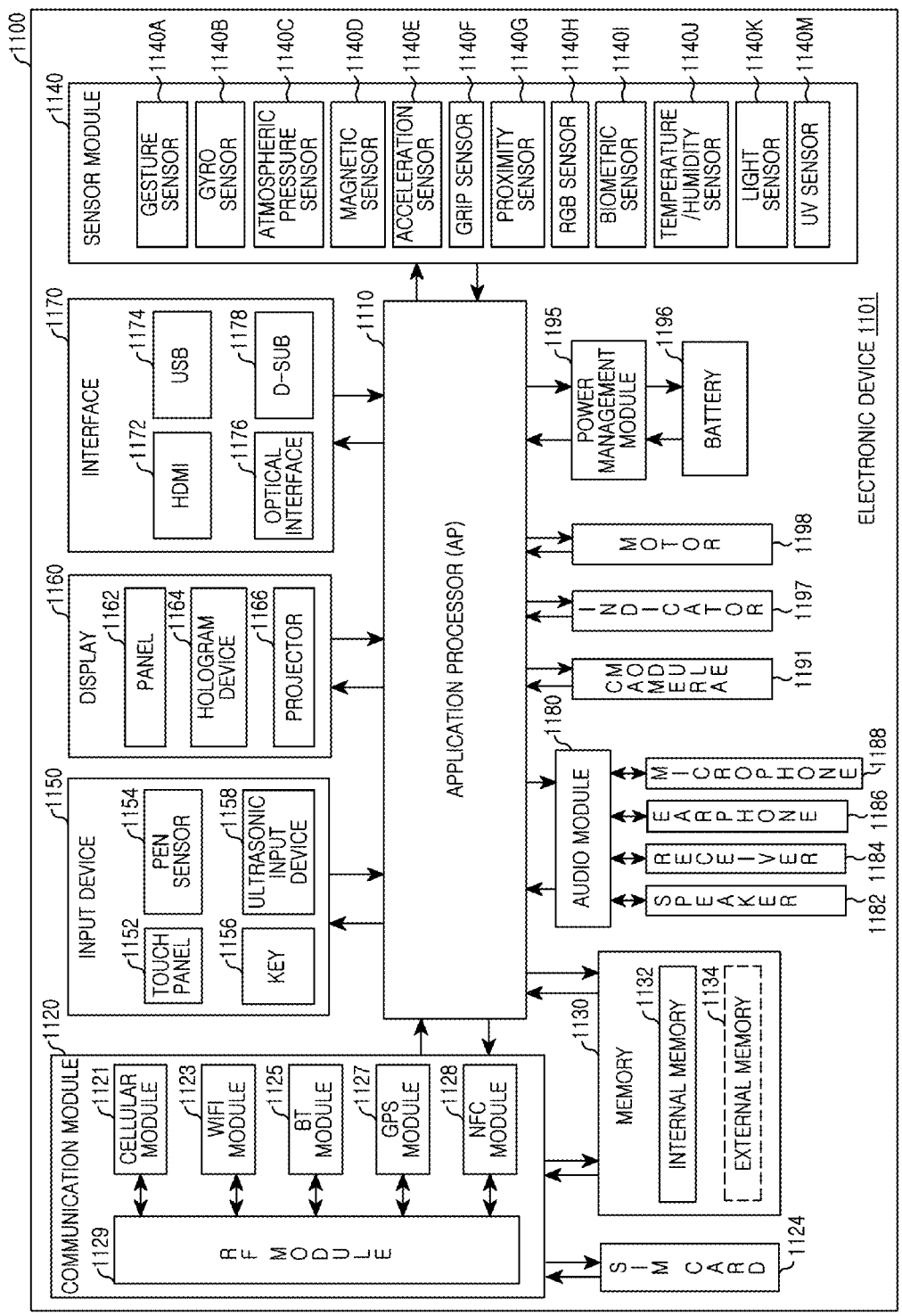
FIG. 11 is a block diagram of an electronic device according to an embodiment of the present disclosure.

FIG. 11 is a block diagram 1100 of an electronic device 1101 according to an exemplary embodiment of the present disclosure. The electronic device 1101 can include all or part of the electronic device 100 of FIG. 1.

Referring to FIG. 11, the electronic device 1101 can include one or more AP 1110, a communication module 1120, a SIM card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 controls hardware or software components connected to the AP 1110 by driving an operating system or an application program, and performs data processing and operations including multimedia data. For example, the AP 1110 can be implemented using an SoC. The AP 1110 can further include a GPU.

The communication module 1120 transmits and receives data in a communication between the electronic device 1101 (e.g., the electronic device 100) and other electronic devices (e.g., the electronic device 104 or the server 106) connected over the network. For example, the communication module 1120 can include a cellular module 1121, a WiFi module 1123, a BT module 1125, a GPS module 1127, an NFC module 1128, and a Radio Frequency (RF) module 1129.

The cellular module 1121 provides voice telephony, video telephony, text messaging, and Internet service over the communication network (e.g., LTE, LTE-A, CDMA, WCDMA, UMTS, WiBro, or GSM). The cellular module 1121 determines and authenticates the electronic device in the communication network using, for example, the SIM card 1124. The cellular module 1121 can perform at least part of the functions of the AP 1110. The cellular module 1121 can perform at least part of the multimedia control function.

The cellular module 1121 can include the CP. The cellular module 1121 can be implemented using, for example, an SoC. Although the components of the cellular module 1121 (e.g., the CP), the memory 1130, and the power management module 1195 are separated from the AP 1110 in FIG. 11, the AP 1110 can include part (e.g., the cellular module 1121) of those components.

The AP 1110 or the cellular module 1121 (e.g., the CP) loads and processes an instruction or data received from its non-volatile memory or at least one of the other components in the volatile memory. The AP 1110 or the cellular module 1121 stores data received from or generated by at least one of the other components in the non-volatile memory.

The WiFi module 1123, the BT module 1125, the GPS module 1127, and the NFC module 1128 each can include a processor for processing data transmitted and received via the corresponding module. Although the cellular module 1121, the WiFi module 1123, the BT module 1125, the GPS module 1127, and the NFC module 1128 are shown separately in FIG. 11, at least some (e.g., two or more) of the cellular module 1121, the WiFi module 1123, the BT module 1125, the GPS module 1127, and the NFC module 1128 can be included in a single IC or IC package. For example, at least some (e.g., the CP corresponding to the cellular module 1121 and the WiFi processor corresponding to the WiFi module 1123) of the processors corresponding to the cellular module 1121, the WiFi module 1123, the BT module 1125, the GPS module 1127, and the NFC module 1128 can be implemented using a single SoC.

The RF module 1129 transmits and receives data, for example, RF signals. The RF module 1129 can includes a transceiver, a Pulse Amplitude-modulation Module (PAM), a frequency filter, or a Low Noise Amplifier (LNA). The RF module 1129 can further include a component, e.g., a conductor or a conducting wire, for sending and receiving electromagnetic waves in free space in a wireless communication. Although the cellular module 1121, the WiFi module 1123, the BT module 1125, the GPS module 1127, and the NFC module 1128 share the single RF module 1129 in FIG. 11, at least one of the cellular module 1121, the WiFi module 1123, the BT module 1125, the GPS module 1127, and the NFC module 1128 can transmit and receive RF signals using a separate RF module.

The SIM card 1124 is a card including a SIM and is inserted into a slot formed at a certain location in the electronic device. The SIM card 1124 includes unique identification information (e.g., Integrated Circuit Card Identifier (ICCID)) or subscriber information (e.g., International Mobile Subscriber Identity (IMSI)).

The memory 1130 (e.g., the memory 130) can include an internal memory 1132 or an external memory 1134. The internal memory 1132 can include at least one of, for example, a volatile memory (e.g., DRAM, SRAM, SDRAM) and a non-volatile memory (e.g., OTPROM, PROM, EPROM, EEPROM, mask ROM, flash ROM, NAND flash memory, NOR flash memory).

The internal memory 1132 may employ an SSD. The external memory 1134 can further include a flash drive, for example, a CF memory card, an SD memory card, a Mini-SD memory card, an xD memory card, or a memory stick. The external memory 1134 can be functionally connected to the electronic device 1101 via various interfaces. The electronic device 1101 can further include a storage device (or a storage medium) such as a hard drive.

The sensor module 1140 measures a physical quantity or detects an operation status of the electronic device 1101, and converts the measured or detected information to an electrical signal. The sensor module 1140 can include at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor (e.g., a Red Green Blue (RGB) sensor) 1140H, a biometric sensor 1140I, a temperature/humidity sensor 1140J, a light sensor 1140K, and an UltraViolet (UV) light sensor 1140M. Additionally or alternatively, the sensor module 1140 can include an Electronic-nose (E-nose) sensor, an EMG sensor, an EEG sensor, an ECG sensor, an InfraRed (IR) sensor, an iris sensor, or a fingerprint sensor. The sensor module 1140 can further include a control circuit for controlling the one or more sensors.

The input device 1150 can include a touch panel 1152, a (digital) pen sensor 1154, a key 1156, and an ultrasonic input device 1158. The touch panel 1152 recognizes a touch input using at least one of capacitive, resistive, infrared, and Surface Acoustic Wave (SAW) techniques. The touch panel 1152 may further include a control circuit. The capacitive touch panel recognizes not only a direct touch but also a proximity touch. The touch panel 1152 may further include a tactile layer. In this case, the touch panel 1152 provides a tactile response to the user.

The (digital) pen sensor 1154 can be implemented using the same or similar method to the user's touch input, or using a separate recognition sheet. The key 1156 can include, for example, a physical button, an optical key, or a keypad. The ultrasonic input device 1158, which obtains data by detecting a microwave signal through a microphone 1188 in the electronic device 1101, allows radio frequency identification through the pen which generates an ultrasonic signal. The electronic device 1101 receives a user input from a connected external device (e.g., a network, a computer, or a server) using the communication module 1120.

The display 1160 can include a panel 1162, a hologram device 1164, and a projector 1166. The panel 1162 can employ a Liquid Crystal Display (LCD) or an Active Matrix Organic Light Emitting Diode (AMOLED) display. The panel 1162 can be implemented flexibly, transparently, or wearably. The panel 1162 may be constructed as a single module with the touch panel 1152. The hologram device 1164 can present a three-dimensional image in the air using the interference of light. The projector 1166 can display an image by projecting light onto a screen. The screen can be internal or external to the electronic device 1101. The display 1160 can further include a control circuit for controlling the panel 1162, the hologram device 1164, or the projector 1166.

The interface 1170 can include, for example, an HDMI 1172, a USB 1174 connector, an optical interface 1176, and a D-sub 1178 connector. The interface 1170 can be included in, for example, the communication interface 160 of FIG. 1. Additionally or alternatively, the interface 1170 can include, for example, a Mobile High-Definition Link (MHL), an SD/MMC interface, or an IrDA interface.

The audio module 1180 converts voice to an electrical signal and vice versa. For example, the audio module 1180 processes sound information input and output through a speaker 1182, a receiver 1184, an earphone 1186, or the microphone 1188.

The camera module 1191 can capture a still picture and a moving picture. For example, the camera module 191 can include one or more image sensors (e.g., a front sensor or a rear sensor), a lens, an Image Signal Processor (ISP), or a flash (e.g., an LED or a xenon lamp).

The power management module 1195 manages power of the electronic device 1101. For example, the power management module 1195 can include a Power Management IC (PMIC), a charger IC, a battery, or a battery gauge. For example, the PMIC can be mounted in an IC or an SoC semiconductor.

The charging type can be divided to a wired type and a wireless type. The charger IC can charge the battery and prevent overvoltage or overcurrent from flowing from a charger. For example, the charger IC can include a charger IC for at least one of the wired charging type or the wireless charging type. For example, the wireless charging type includes magnetic resonance, magnetic induction, and microwave, and can further include an additional circuit such as a coil loop, a resonance circuit, and a rectifier circuit for the wireless charging.

The battery gauge measures, for example, the remaining capacity of the battery 1196 and the voltage, the current, or the temperature of the charging. The battery 1196 can store or produce electricity and supply the power to the electronic device 1101 using the stored or produced electricity. For example, the battery 1196 can be a rechargeable battery or a solar battery.

The indicator 1197 displays a certain status, for example, a booting state, a message state, or a charging state of the electronic device 1101 or part (e.g., the AP 1110) of the electronic device 1101. The motor 1198 converts an electrical signal to a mechanical vibration. The electronic device 1101 can include a processor (e.g., the GPU) for supporting mobile TV. For example, the processor for supporting mobile TV can process media data in conformity with a Digital Multimedia Broadcasting (DMB), a Digital Video Broadcasting (DVB), or a media flow standard.

The aforementioned components of the electronic device can include one or more parts, and the name of the corresponding component can differ according to the type of the electronic device. The electronic device of the present disclosure can include at least one of the components, omit some components, or further include other components. Some of the electronic device components can be combined into a single entity to carry out the same functions of the corresponding components.

The term "module" used in an embodiment of the present disclosure indicates, for example, a unit including a combination of one or more of hardware, software, or firmware. The "module" can be interchangeably used with the terms, for example, "a unit," "logic," "a logical block," "a component," or "a circuit." The "module" can be a minimum unit or part of the components integrally formed. The "module" may be a minimum unit or part of one or more functions. The "module" can be implemented mechanically or electronically. For example, the "module" can include at least one of an Application-Specific Integrated Circuit (ASIC), a Field-Programmable Gate Array (FPGA), or a programmable-logic device for performing operations which are well known or will be developed.

At least part of the device (e.g., the modules or the functions) or the method (e.g., the operations) described in the appended claims and/or the specifications of the present disclosure can be implemented using, for example, instructions stored as the programming module in a non-transitory computer-readable storage medium. For example, when an instruction is executed by one or more processors (e.g., the processor 120), the one or more processors perform the corresponding function. The non-transitory computer-readable storage medium can be, for example, the memory 130. At least part of the programming module can be implemented (e.g., executed) by the processor 120. At least part of the programming module can include, for example, a module, a program, sets of instructions, or a process for performing one or more functions.

The non-transitory computer-readable recording medium can include magnetic media such as a hard disk, a floppy disk and a magnetic tape, an optical media such as a Compact Disc Read Only Memory (CD-ROM) and a Digital Versatile Disc (DVD), magneto-optical media such as a floptical disk, and hardware devices specifically configured to store and execute an application instruction (e.g., the programming module) such as a Read Only Memory (ROM), a Random Access Memory (RAM), and a flash memory. A program instruction can include not only machine code made by a compiler but also high-level language code executable by a computer using an interpreter. The above-stated electronic device can serve as one or more software modules for fulfilling the operations of an embodiment of the present disclosure, and vice versa.

The module or the programming module according to an embodiment of the present disclosure can include at least one of the aforementioned components, omit some components, or further include other components. The operations fulfilled by the modules, the programming modules, or other components can be carried out in sequence, in parallel, repeatedly, or heuristically. In addition, some operations can be executed in a different order or omitted, or other operations can be added.

In a recording medium storing the instructions, the instructions, when executed by at least one processor, make the at least one processor conduct at least one operation. The at least one operation can include detecting a fingerprint swipe and identifying a fingerprint based on an image acquired from the fingerprint swipe As set forth above, the fingerprint identifying method and the electronic device can enhance the fingerprint identification rate through the fingerprint swipe. The fingerprint identifying method and the electronic device can enhance user convenience for the fingerprint identification. When the fingerprint is input, the fingerprint identifying method and the electronic device can provide entertainment and various user interfaces based on the fingerprint input direction.

While the present disclosure has been shown and described with reference to certain embodiments thereof, it will be understood by those skilled in the art that various changes in form and details may be made therein without departing from the scope and spirit of the present disclosure, as defined by the appended claims and their equivalents.

What is claimed is:

1. A method of operating an electronic device, comprising:
   detecting a plurality of fingerprint drags if a finger is swiped on a portion of the electronic device, wherein each of the plurality of fingerprint drags is a consecutive drag from a previous drag and each of the plurality of fingerprint drags has a different orientation from each other while a finer orientation remains substantially unchanged during each drag;
   comparing a plurality of images corresponding to the plurality of fingerprint drags and a corresponding portion of a reference image; and
   identifying a fingerprint based on a result of the comparison between the plurality of images corresponding to the plurality of fingerprint drags and a corresponding portion of a reference image.

2. The method of claim 1, wherein detecting the plurality of fingerprint drags if a finger swiped on the portion of the electronic device comprises continuously detecting the plurality of fingerprint drags through a fingerprint sensor during a reference time.

3. The method of claim 2, wherein the plurality of images is consecutively acquired through the fingerprint sensor.

4. The method of claim 3, wherein identifying the fingerprint based on the comparison result comprises identifying the fingerprint according to whether at least one of the plurality of images matches the corresponding portion of the reference image.

5. The method of claim 1, further comprising:
   executing an application corresponding to an orientation of each of the plurality of fingerprint drags.

6. The method of claim 5, wherein executing the application corresponding to the orientation of each of the plurality of fingerprint drags comprises determining an icon display location of the application based on the orientation.

7. The method of claim 1, further comprising:
   when detecting the plurality of fingerprint drags, displaying a content based on a movement of the plurality of fingerprint drags.

8. The method of claim 1, further comprising:
   when identifying the fingerprint, executing one of a screen unlock function, a security setting function, an information transport function, and an electronic payment function.

9. The method of claim 1, further comprising:
   when identifying the fingerprint, outputting a fingerprint identification notice using at least one of a sound, a Light Emitting Diode (LED), a vibration, and a popup.

10. An electronic device, comprising:
    a Fingerprint sensor configured to detect a plurality of fingerprint drags if a finger is swiped on a portion of the electronic device, wherein each of the plurality of fingerprint drags is a consecutive drag from a previous drag and each of the plurality of fingerprint drags has a different orientation from each other while a finger orientation remains substantially unchanged during each drag; and
    a processor configured to compare a plurality of images corresponding to the plurality of fingerprint drags and a corresponding portion of a reference image, and identify a fingerprint based on a result of the comparison between the plurality of images corresponding to the plurality of fingerprint drags and a corresponding portion of a reference image.

11. The device of claim 10, wherein the processor is further configured to continuously detect the plurality of fingerprint drags through the fingerprint sensor during the reference time.

12. The device of claim 11, wherein the processor is further configured to consecutively acquire the plurality of images through the fingerprint sensor.

13. The device of claim 12, wherein the processor is further configured to identify the fingerprint according to whether at least one of the plurality of images matches the corresponding portion of the reference image.

14. The device of claim 10, wherein the processor is further configured to execute an application corresponding to an orientation of each of the plurality of fingerprint drags.

15. The device of claim 14, wherein the processor is further configured to determine an icon display location of the application based on the orientation.

16. The device of claim 10, wherein, the processor is further configured to, when detecting the plurality of fingerprint drags, display a content based on a movement of the plurality of fingerprint drags.

17. The device of claim 10, wherein, the processor is further configured to, when identifying the fingerprint, execute one of a screen unlock function, a security setting function, an information transport function, and an electronic payment function.

18. The device of claim 10, wherein, the processor is further configured to, when identifying the fingerprint, output a fingerprint identification notice using at least one of a sound, a Light Emitting Diode (LED), a vibration, and a popup.

19. The device of claim 10, wherein the fingerprint sensor is included in a home button of the electronic device.

20. A non-transitory computer-readable recording medium storing a program which executes a method of operating an electronic device, the method comprising detecting a plurality of fingerprint drags if a finger is swiped on a portion of the electronic device, wherein each of the plurality of fingerprint drags is a consecutive drag from a previous drag and each of the plurality of fingerprint drags has a different orientation from each other while a linger orientation remains substantially unchanged during each drag, comparing a plurality of images corresponding to the plurality of fingerprint drags and a corresponding portion of a reference image, and identifying a fingerprint based on a result of the comparison between the plurality of images corresponding to the plurality of fingerprint drags and a corresponding portion of a reference image.

\* \* \* \* \*